United States Patent [19]

Fergason

[11] Patent Number: 5,717,422
[45] Date of Patent: Feb. 10, 1998

[54] VARIABLE INTENSITY HIGH CONTRAST PASSIVE DISPLAY

[76] Inventor: James L. Fergason, 92 Adam Way, Atherton, Calif. 94025

[21] Appl. No.: 558,465

[22] Filed: Nov. 16, 1995

Related U.S. Application Data

[63] Continuation of Ser. No. 187,163, Jan. 25, 1994, abandoned.

[51] Int. Cl.⁶ .................................................. G09G 3/36
[52] U.S. Cl. .................................... 345/102; 345/150
[58] Field of Search ................................ 345/102, 150

[56] References Cited

U.S. PATENT DOCUMENTS

| | | | |
|---|---|---|---|
| Re. 32,521 | 10/1987 | Fergason | 349/1 |
| 2,885,551 | 5/1959 | Greanias | 382/50 |
| 3,854,793 | 12/1974 | Kahn | 349/128 |
| 4,090,219 | 5/1978 | Ernstoff et al. | 358/59 |
| 4,097,128 | 6/1978 | Matsumoto et al. | 349/78 |
| 4,114,990 | 9/1978 | Mash et al. | 349/96 |
| 4,114,998 | 9/1978 | Mash et al. | 355/133 |
| 4,385,806 | 5/1983 | Fergason | 349/34 |
| 4,436,376 | 3/1984 | Fergason | 349/1 |
| 4,468,703 | 8/1984 | Fujiwara | 382/51 |
| 4,540,243 | 9/1985 | Fergason | 349/1 |
| 4,582,396 | 4/1986 | Bos et al. | 345/88 |
| 4,611,889 | 9/1986 | Buzak | 349/69 |
| 4,648,691 | 3/1987 | Oguchi et al. | 349/162 |
| 4,760,389 | 7/1988 | Aoki et al. | 345/207 |
| 4,834,500 | 5/1989 | Hilsum et al. | 349/199 |
| 4,923,286 | 5/1990 | Grupp | 349/129 |
| 4,958,915 | 9/1990 | Okada | 345/102 |
| 4,997,263 | 3/1991 | Cohen | 345/102 |
| 5,093,652 | 3/1992 | Bull | 345/102 |
| 5,128,782 | 7/1992 | Wood | 345/102 |
| 5,144,292 | 9/1992 | Shiraishi | 345/102 |
| 5,162,785 | 11/1992 | Fagard | 345/207 |
| 5,221,982 | 6/1993 | Faris | 359/93 |
| 5,295,009 | 3/1994 | Barnik et al. | 359/65 |
| 5,313,225 | 5/1994 | Miyadera | 345/102 |
| 5,315,695 | 5/1994 | Saito et al. | 345/102 |
| 5,319,478 | 6/1994 | Funfschilling et al. | 359/53 |
| 5,325,218 | 6/1994 | Willett et al. | 349/74 |

FOREIGN PATENT DOCUMENTS

| | | |
|---|---|---|
| 579534 | 11/1988 | Australia . |
| 55-73023 | 6/1980 | Japan . |
| 56-114931 | 9/1981 | Japan . |
| 58-142315 | 8/1983 | Japan . |
| 62-47623 | 3/1987 | Japan . |
| 62-231221 | 10/1987 | Japan . |
| 63-13018 | 1/1988 | Japan . |
| 039320 | 1/1991 | Japan . |
| 3-249730 | 11/1991 | Japan . |
| 3249730 | 11/1991 | Japan . |
| 3-288885 | 12/1991 | Japan . |
| 3288885 | 12/1991 | Japan . |
| 2033602 | 5/1980 | United Kingdom . |

Primary Examiner—Raymond J. Bayerl
Assistant Examiner—Matthew Luu
Attorney, Agent, or Firm—Renner, Otto, Boisselle & Sklar

[57] ABSTRACT

A display includes a light modulator, a source of light, and a control for controlling the intensity of light from the source supplied to the light modulator thereby to provide images of good contrast for both bright and dark scenes. A method of displaying an image using a passive light modulating display apparatus includes controlling the intensity of light illuminating the display apparatus as a function of a brightness characteristic of the image.

25 Claims, 8 Drawing Sheets

VARIABLE INTENSITY HIGH CONTRAST PASSIVE DISPLAY

This application is a continuation of copending application(s) Ser. No. 08/187,163 filed on Jan. 25, 1994, now abandoned.

TECHNICAL FIELD

The present invention relates generally, as is indicated, to variable intensity high contrast passive displays and methods of displaying images.

BACKGROUND

The displaying of a dark scene using a display device (sometimes referred to as a passive display), which modulates light received from a separate light source, encounters a disadvantage which ordinarily is not present for displays which produce their own light, such as a cathode ray tube (CRT). The problem has to do with reduced resolution and/or contrast of the displayed image.

In a CRT, for example, when it is desired to display a dark scene, the intensity of the output light can be reduced. The different parts of the dark scene, then, all may be output at the reduced-brightness or illuminance level. All pixels (e.g., picture elements, phosphor dots in a monochrome display or group of three red, green and blue phosphor dots for a multicolor display, etc.) of the CRT can be active so that resolution is maintained even though intensity of the light produced by the phosphors is reduced.

However, in a passive display device, such as a liquid crystal display, an electrochromic display, etc., whether of the light transmitting type or of the light reflecting type, the usual practice to reduce brightness of a displayed image or scene is to reduce the number of pixels which are transmitting light at a particular moment. Such a reduction reduces the resolution of the display. Also, such a reduction can reduce the contrast of the display.

The human eye has difficulty distinguishing between seeing or recognizing the difference between low and high brightness and contrast ranges. This difficulty is increased when the number of pixels is decreased and resolution is degraded.

It would be desirable to improve the contrast and resolution of passive displays.

SUMMARY

With the foregoing in mind, an aspect of the invention relates to an apparatus for displaying an image including a light modulating passive display, and a control for controlling the intensity of light supplied to the light modulating passive display.

Another aspect relates to a display including a light modulator, a source of light, and a control for controlling the intensity of light from the source supplied to the light modulator.

A further aspect relates to a method of displaying an image using a passive light modulating display apparatus including controlling the intensity of light illuminating the display apparatus as a function of a brightness characteristic of the image.

An aspect of the invention relates to an apparatus for displaying an image including a light modulating passive display, and a control for controlling the intensity of light supplied to the light modulating passive display while the display is operated in a field sequential mode.

An aspect of the invention relates to an apparatus for displaying an image including a light modulating passive display, and a control for controlling the intensity of respective lights of different color sequentially supplied to the light modulating passive display while the display is operated in a field sequential mode.

Another aspect relates to a display including a light modulator, a source of light, and a control for controlling the intensity of light from the source supplied to the light modulator while the modulator is operated in a field sequential mode.

Another aspect relates to a display including a light modulator, sources of light of different respective colors, and a control for controlling the intensity of light from the respective sources supplied to the light modulator while the modulator is operated in a field sequential mode.

A further aspect relates to a method of displaying an image using a passive light modulating display apparatus including controlling the intensity of light illuminating the display apparatus as a function of a brightness characteristic of the image while the display apparatus is operated in a field sequential mode.

A further aspect relates to a method of displaying an image using a passive light modulating display apparatus including controlling the intensity of plural lights of different respective colors illuminating the display apparatus as a function of a brightness characteristic of the image while the display apparatus is operated in a field sequential mode.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

DESCRIPTION

Figure 1:
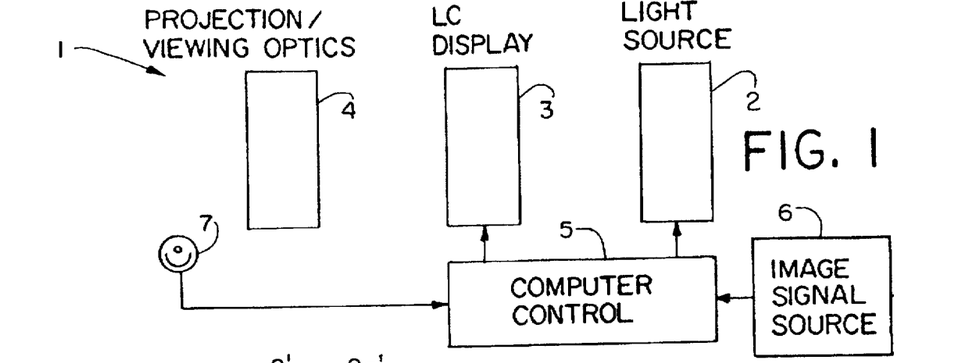
FIG. 1 is a schematic illustration of a light transmissive display system according to the invention.

Referring to the drawings, wherein like reference numerals depict like elements in the several figures, and initially to FIG. 1, a light transmissive display system according to the invention is illustrated at 1. The display system 1 includes a light source 2, liquid crystal display 3, optics 4 for projection or viewing of the images created by the liquid crystal display 3, a computer control 5, and an image signal source 6. A photodetector 7 also may be included in the system 1.

The light source 1 may be one or more light emitting diodes, incandescent light source, fluorescent light source, light received via fiber optics or other means, a metal halide lamp, etc.

The liquid crystal display 3 may be a twisted nematic liquid crystal cell, a variable birefringence liquid crystal cell, a supertwist liquid crystal cell, or some other type or liquid crystal cell able to modulate light. The liquid crystal display 3 may include polarizers, wave plates, such as quarter wave plates or other wave plates, means for compensating for residual birefringence or for problems encountered during off axis viewing, etc. Other types of display devices which modulate light as a function of some type of controlled input can be used in place of the liquid crystal cell 3. Exemplary liquid crystal cells and display devices which may be used for the liquid crystal cell 3 are disclosed in U.S. Pat. Nos. 4,385,806, 4,436,376, 4,540,243, Re. 32,521, and 4,582,396 and in concurrently filed, commonly owned U.S. Pat. application Ser. No. 08/187,050 entitled "Folded Variable Birefringence Liquid Crystal Apparatus." The disclosures of the aforesaid patents and patent application are hereby incorporated by reference.

The optics 4 may be one or more lenses separate from and/or included as part of the liquid crystal display for the purpose of providing an output image for viewing or for projection. If for viewing, such optics 4 may be one or more lenses which focus an image for close, e.g., as in a head mounted display of the heads up display type, virtual reality type or multimedia type, or far viewing, e.g., as in a slide viewer or a television. If for projection, such optics 4 may include projection optics which project an image formed by the display 3 onto a screen for transmissive viewing or reflective viewing.

The image signal source 6 may be a source of computer graphics signals, NTSC type television (video) signals, or other signals intended to produce an image on the display 3. Such signals are decoded in conventional manner by the computer control 5, for example, as is the case in many display systems, and in response to such decoding or deciphering, the computer control 5 (or some other appropriate control, circuit, etc.) operates the display 3 to produce desired images. If desired, the computer control 5 can operate the display 3 in sequential manner to produce multiple images in sequence while the display is being illuminated by only a single light source or color of light, e.g., a monochromatic type of operation. Exemplary operation of this type is summarized in the above '396 patent. Other exemplary types of operation of the computer control 5 include those employed in conventional liquid crystal display televisions of the hand-held or larger type and/or liquid crystal type computer monitors. Alternatively, the computer control can operate the display 3 in a field sequential or frame sequential manner whereby a particular image is formed in several parts; while one part is formed, the display is illuminated by light of one color; while another part is formed, the display is illuminated by light of a different color; and so on. Using this field sequential type operation, multicolor images can be produced by the display system apparatus 1.

In a typical input signal to a television or liquid crystal television, there is information indicating brightness of the light to be transmitted (or reflected) at a particular pixel. The computer control 5 is operative to compute the brightness information of a particular image or scene and in response to such computation to control the intensity or brightness of the light source 2. While intensity or brightness of the light source is controlled in this manner, the computer control 5 operates the liquid crystal display 3 to modulate light without having to reduce the number of pixels used to transmit light. Therefore, the full number or a relatively large number of pixels can be used to form the image or scene even if the brightness of the scene as controlled by the controlled light source is relatively dark.

Information coming through from the image signal source 6 may indicate various levels of illumination. There usually is a blanking pulse and a data line pulse. The computer control 5 can take the integral of the data line electrically or an integral of the whole set of data (from all of the data lines of the scene) or all of the pixels while electrically skipping the blanking. Based on that integral, the brightness of the light incident on the display 3 is controlled by the computer control 5. It will be appreciated that a person having ordinary skill in the art would be able to prepare an appropriate computer program to provide the integral functions and to use the results of such integration to provide brightness control for the light source 2.

From the foregoing, then, it will be appreciated that the apparatus 1, including the computer control 5, is operative to control or to adjust the brightness of a scene without degrading the contrast ratio. Thus, the same contrast ratio can be maintained while brightness of a scene or image is adjusted. For example, the same contrast ratio or substantially the same contrast ratio can be maintained by the apparatus 1, whether depicting a scene of a bright sunlit environment or of the inside of a dark cave. Therefore, the scene will have the appearance of illumination under natural illumination conditions.

The features of the invention can be used in virtually any passive display system.

Power requirements of the apparatus 1 can be reduced over prior display systems because the intensity of light produced by the source 2 is controlled to create dark images. In prior systems, though, the intensity of the light produced by the source was maintained substantially constant while the amount of light permitted to be transmitted through the passive display would be reduced to create a dark scene image.

In addition to controlling intensity of the light source 2 as a function of brightness of a scene, the computer control 5 also may be responsive to measurement or detection of the ambient environment in which the apparatus 1 is located. The brightness of such ambient environment may be detected by the photodetector 7. The photodetector 7 may be place in a room or elsewhere where the image created by the display 3 is to be viewed; and the brightness of the source 2 can be adjusted appropriately. For example, if the room is dark, it usually is desirable to reduce brightness of the source; and if the room is bright or the apparatus is being used in sunlight, the brightness of the source may be increased.

Figure 2:
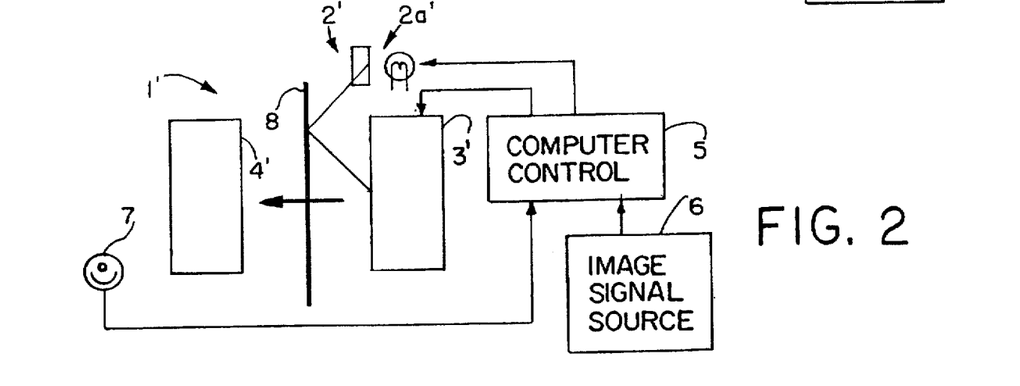
FIG. 2 is a schematic illustration of a light reflective display system according to the invention.

Turning to FIG. 2, a light reflective display system according to the invention is illustrated at 1'. The display system 1' includes a light source 2', liquid crystal display 3', optics 4' for projection or viewing of the images created by the liquid crystal display 3', a computer control 5', and an image signal source 6. A photodetector 7 also may be included in the system 1. The various parts of the display 3' and optics 4' may be the same or similar to those disclosed in the concurrently filed, commonly owned U.S. patent application referred to above. The light source 2' and display 3' may be of the type disclosed in concurrently filed, commonly owned U.S. Pat. application Ser. No. 08/187,162 entitled "Illumination System For A Display," the entire disclosure of which hereby is incorporated by reference.

For example, the light source 2' may include a source of circularly polarized light 2a' and a cholesteric liquid crystal reflector 8. The liquid crystal display 3' may be a reflective variable birefringence liquid crystal display device.

Full Color Frame Sequential Illumination System and Display.

Figure 3:
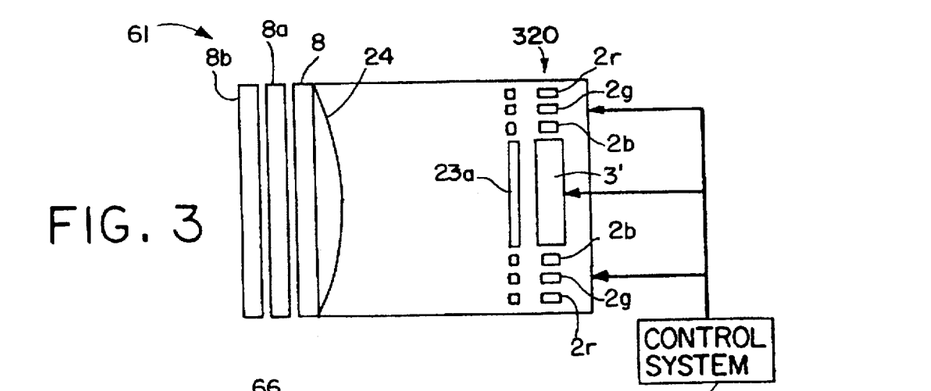
FIG. 3 is a schematic view of a reflective field sequential display and illumination system using plural cholesteric liquid crystal reflectors and plural light sources of respective colors to provide a multicolor or full color display.

Turning to FIG. 3, a full color display subsystem 61 including illumination system 320 is shown. However, in the display subsystem 61 the illumination system 320 includes several sources of light, each having a different wavelength. For example, three separate light sources 2r, 2g, 2b provide red, green and blue wavelength light, respectively, or light that is in respective wavelength bands or ranges that include red, green and blue, respectively. The light sources may be respective light emitting diodes or they may be other sources of red, green and blue light or other respective wavelengths of light, as may be desired for use in the display subsystem 61. The cholesteric liquid crystal reflector 8 is able to reflect green light; the reflector 8a is able to reflect red light; the reflector 8b is able to reflect blue light. Such reflection occurs when the circular polarization characteristic of the light is the same direction as the twist direction of the cholesteric liquid crystal material in the respective reflector. The reflectors 8, 8a, 8b are transparent to the other polarizations of incident light and to the other wavelengths of incident light.

The illumination system 320 is intended sequentially to illuminate the display 3', which may include a wave plate, such as a quarter wave plate 9, (or respective portions of the display) with respective wavelengths of light. For example, for a period of time the display 3' (or portion thereof) is illuminated with red light; subsequently illumination is by either green or blue light; and still subsequently illumination is by the other of green or blue light. Such sequential illumination may be carded out sufficiently rapidly so that respective red, green and blue images created by the display 3' when illuminated by the respective colors of light are output from the display subsystem 61 and are integrated by the human eye. As a result, the human eye effectively sees a multicolor image. Other examples of frame sequential switching to provide multicolor and/or full color outputs are known in the art. Various advantages inure to a frame sequential multicolor display, including the ability to provide high resolution with approximately one-third the number of picture elements required for a full color r, g, b display system in which respective pixels are red, green or blue.

The sequential delivering of red, green and blue light to the display 3' is coordinated by the control system 5 with the driving of the display 3'. Therefore, when a red image or a portion of a red image is to be produced by the display 3', it is done when red light is incident on the display 3'; and the similar type of operation occurs with respect to green and blue images.

If the respective light sources 2r, 2g, 2b are light emitting diodes, they may be sequentially operated or energized to provide light in coordination with the operation of the display 3' under direct control and/or energization by the control system 5. Alternatively, the control system 5 may be coordinated with whatever other means are used to provide the respective red, green and blue color lights of the light source.

Another example of frame sequential or field sequential operation of a displays subsystem like that shown at 11 herein is described in the above-referenced patent applications. Another example of field sequential operation is described in U.S. Pat. No. 4,582,396, which is mentioned above and incorporated by reference.

Figure 4:
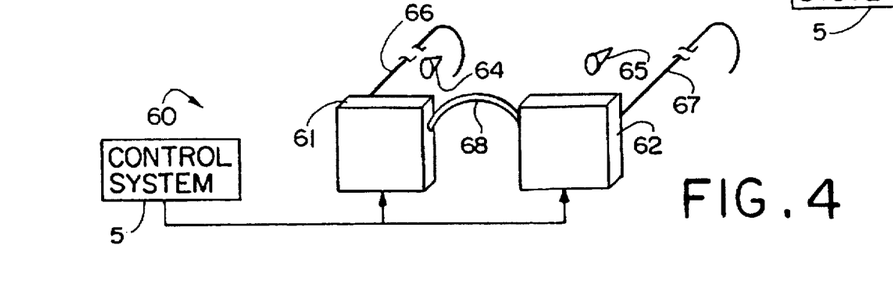
FIG. 4 is a schematic view of a head mounted display system including a pair of display subsystems, each with an illumination system of the invention.

Referring to FIG. 4, a head mounted display 60 includes a pair of display systems 61, 62 and a control system 5 for creating images intended to be viewed by the eyes 64, 65 of a person. The display systems 61, 62 may be positioned in relatively close proximity, for example, at approximately one inch distance, to the respective eyes 64, 65. A mounting mechanism, such as temple pieces 66, 67 and a nose bridge 68 may be provided to mount the display 60 on the head of the person.

The control system 5 in conjunction with the display systems 61, 62 are intended to create images for viewing by the eyes. Those images may be monochromatic. The images may be multicolor. The images may be two-dimensional or they may provide a three dimensional, stereoscopic effect. Stereoscopic effect viewing is obtained when the control system 5 operates the display systems 61, 62 to provide, respectively, right eye and left eye images that are sufficiently distinct to provide depth perception. Right eye, left eye imaging and depth perception are techniques used in some stereoscopic imaging and viewing systems which are commercially available.

The display systems 61, 62 may be identical. The control system 5 provides control and/or power input to the display systems 61, 62 to create images for display to the eyes 64, 65. The display 60 may be a head mounted display, such as a heads-up display, a virtual reality display, or a multimedia display. The control system 5 may be generally a control system of the type used in known head mounted displays to create such images. Such a control system may provide for control of color, light intensity, image generating, gamma, etc. The display systems 61, 62 may include focusing optics so as to focus the image created by the display systems for comfortable viewing, for example from a few inches up to a few feet in front of the eyes, say, from about 20 inches to about several feet in front of the eyes.

It will be appreciated that the features of the liquid crystal cell 3' may be used in the display 60 of the head mounted type. Also, features of the invention may also be employed in other types of display systems. One example is a display system that uses only a single display system of the type described herein. Such display system may be located in proximity to an eye for direct viewing. Alternatively, such display system may be used as part of a projection type display in which light from the display system is projected onto a surface where the image is formed for viewing. Various lenses and/or other optical components may be used to direct from the display system light to create an appropriate image at a desired location.

Figure 5:
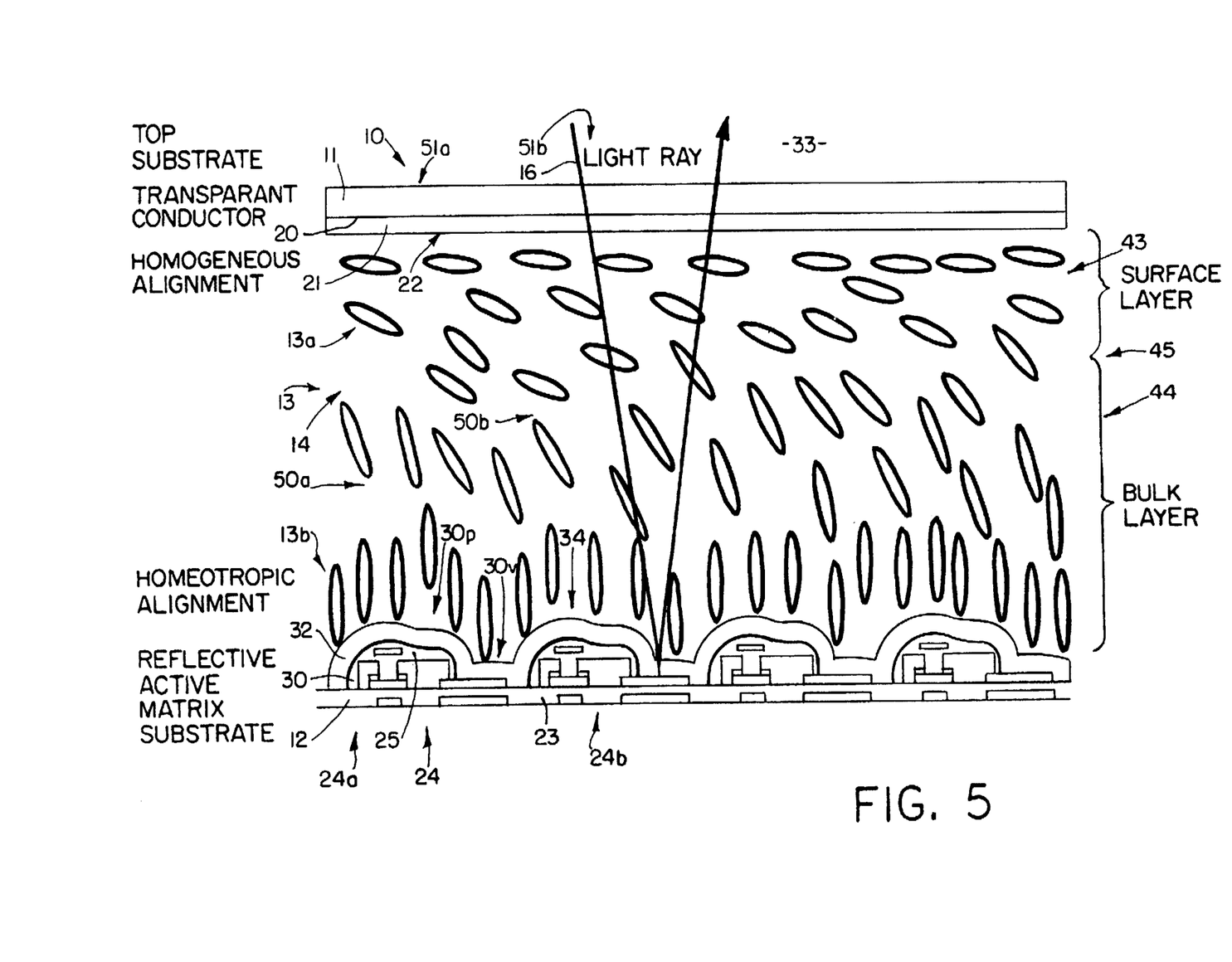
FIG. 5 is a schematic side elevation view of a reflective variable birefringence liquid crystal cell having an active matrix substrate, the cell being aligned ready for operation.

Referring to FIG. 5, a reflective variable birefringence liquid crystal cell having an active matrix substrate in accordance with the present invention is indicated at 3'. The liquid crystal cell 3' includes a pair of substrates 11, 12 and liquid crystal material 13 in the space 14 between the substrates. A seal is provided about the perimeter of the liquid crystal cell to retain the liquid crystal material therein preventing leakage.

Of the liquid crystal material 13, the liquid crystal material 13a relatively proximate (meaning relatively near or at) the substrate 11 generally has homogeneous alignment. The liquid crystal material 13b relatively proximate the substrate 12 has generally homeotropic alignment. During operation of the liquid crystal cell 3' optical phase retardation of light 16 (represented by a light ray line shown) traveling through the liquid crystal material can be controlled as a function of the applied electric field across the liquid crystal material, as is described in greater detail below.

The substrate 11 may be glass, plastic, or some other material, as may be desired. The surface 20 of the substrate 11 facing the liquid crystal material 13 is relatively smooth or flat. A transparent conductor 21 is on and/or supported by the surface 20 of the substrate 11. The conductor may be indium tin oxide or some other material that has electrically conductive characteristics suitable for use in the energization of the liquid crystal cell, for example application of electric field. The conductor 21 may be applied by a variety of conventional techniques. Surface treatment 22 is provided the substrate 11 to obtain the desired homogeneous alignment of liquid crystal material 13a. The surface treatment may be a polyimide coating, which may or may not be rubbed, a coating of polyvinyl alcohol, which preferably is rubbed, or a direct rubbing of the exposed surface of the conductor 21. Rubbing may be done in conventional manner using cotton, felt or other material, as is well known. Other types of surface treatment also may be used to obtain the desired alignment.

The liquid crystal material 13 preferably is nematic liquid crystal material. A characteristic of nematic liquid crystal is that it tends to have directional orientation and not positional orientation, this being in contrast to smectic liquid crystal material which tends to have both directional and positional orientation. Another characteristic of nematic liquid crystal is that it tends to align with respect to a surface that is engaging or bounding the liquid crystal material, and the nature of such alignment may be governed by surface treatment. The alignment referred to herein is sometimes referred to as structural alignment, direction of liquid crystal axis or optical axis, direction of the liquid crystal directors, liquid crystal orientation, etc. Nematic liquid crystal also may be birefringent; desirably the nematic liquid crystal material 13 is birefringent to cause the desired optical phase retardation as a function of liquid crystal alignment or liquid crystal cell energization. An example of nematic liquid crystal material 13 is that sold under the designations E7, E22 and E54 (each sold by E. Merck).

The liquid crystal cell 3' will function with many other different nematic liquid crystal materials. In the embodiment of liquid crystal cell 3' the liquid crystal material should have positive dielectric anisotropy and be birefringent. The actual nematic liquid crystal material used may be selected as a function of speed of response desired by the liquid crystal cell 3'; that speed may be a function of the elastic constants of the liquid crystal material and of the thickness of the liquid crystal cell, i.e., of the liquid crystal material layer in the cell. Cell thickness and the birefringence of the liquid crystal material collectively would be characteristics that affect the total mount of optical phase retardation that is possible by the cell. For example, for a liquid crystal cell that is to be about 6 microns thick and to provide approximately ¼ lambda optical phase retardation on each pass of light 16 through the cell 3' a liquid crystal material, such as 1840 sold by B. Merck, which has a birefringence of from about 0.10 to about 0.12 would be useful. If such liquid crystal cell were to have a thickness of about 3 microns the birefringence of the liquid crystal material may be on the order of about 0.22, which is that for the liquid crystal material commonly designated E54. Liquid crystal material E7 is more suited to a liquid crystal cell which has a thickness or spacing of about 3 to 4 microns. Other liquid crystal materials suitable for these devices are identified in the catalog book "Merck Liquid Crystals, Merck Liquid Crystal Mixtures For Electro-Optic Displays" published by E. Merck September, 1992, which is hereby fully incorporated by reference.

In selecting a liquid crystal material for use in the cell 3' consideration also can be given to the field of view expected of the display using such cell. Usually the greater the birefringence of the liquid crystal material the narrower the angle of or field of view of the display over which an image of acceptable quality would be produced. Therefore, it is desirable that the birefringence be as low as possible consistent with the desired speed of response and thickness of the cell. Usually, the higher the birefringence of the liquid crystal material or the thinner the liquid crystal cell, the faster the switching speed of the cell.

In an example of the invention the liquid crystal cell 3' is able to provide a maximum of more than ¼ lambda retardation. During operation of the cell 3' it would be able to be switched between approximately or precisely zero retardation and ¼ lambda retardation. Preferably, as a function of the magnitude of electric field applied across the liquid crystal material 13 in the cell 3' the cell would be able to provide any amount of retardation between zero and ¼ lambda. The precise amount of retardation may vary slightly as a function of the wavelength of the light, as is known on account of the phenomenon of color dispersion; however, preferably the cell 3' is operated approximately at sufficiently low order, most preferably in the zero order range, so that the effects of color dispersion will be minimal if they exist at all.

The actual amount of retardation provided by the cell 3' operated in the reflective mode will be twice that provided by the liquid crystal layer 13 since the light passes through the cell twice. Therefore, a liquid crystal cell 3' which provides ¼ lambda retardation on the passage of light from one substrate to the other will provide that amount of retardation again as the light is reflected back to the first substrate. Accordingly, a cell 3' operated between 0 and ¼ lambda retardation will actually provide between 0 and ½ lambda retardation.

The substrate 12 is an active matrix semiconductor substrate. More particularly, the substrate 12 is a silicon substrate 23 having therein a plurality of electrical and/or electronic components 24 (the terms electrical and electronic regarding the substrate 23 may be used interchangeably below) formed by various solid state techniques that are known in the art. The substrate may be a single crystal silicon material.

Most TFT display devices use amorphous silicon or polysilicon. Either may be used in the case of the present invention. However, single crystal silicon is preferred because of the relatively uncomplicated standard processing techniques available to make devices from such material, exemplary devices being conventional RAM, DRAM and other semiconductor devices. Therefore, single crystal silicon substrates are readily available and reasonably inexpensive. Also, virtually any circuit configuration can be incorporated into the silicon semiconductor substrate material; and such circuits can work with a wide range of voltages. Although single crystal silicon usually is not transparent, it is useful in the present invention in which the liquid crystal cell 3' is operated in the reflective mode. If desired, other materials can be used for the substrate 12, such as gallium arsenide, germanium and/or other materials used in the semiconductor field.

On and/or in the silicon substrate 23 are a plurality of such components 24, such as transistors, electrodes, capacitors, diodes, and/or other components. A representative electrode is indicated at 25. The electronic components 24 are functional in response to an applied input to provide a voltage on or to electrodes 25 so that there is potential difference between the electrode 25 and the electrode 21 on the substrate 11. Such voltage and potential difference create an electric field between the electrodes 21, 25. Such electric field causes liquid crystal material to align relative to that field. By increasing or decreasing the magnitude of the field, more or less of the liquid crystal material located between the respective electrode 25 and the electrode 21, for the most part in a direct path there between, will align or not relative to the field. An exemplary active matrix substrate is manufactured and sold by a number of companies including Teleview Research, Inc., Palo Alto, Calif.

The liquid crystal material may be operationally nematic. Operationally nematic liquid crystal may or may not be nematic liquid crystal material; however, the operational properties of such material, e.g., being responsive to surface interaction to undergo alignment, having desired birefringence or other optical characteristics, being responsive to application of a prescribed input such as a field input, for example, an electric field, should be sufficiently similar to nematic liquid crystal to function in the cell 3' generally as is described herein.

The liquid crystal material may be smectic liquid crystal. Smectic liquid crystal tends to have memory or to hold alignment after having been aligned by a particular input, such as the application of a field. However, such alignment can be altered, for example, by application of heat to cause the smectic liquid crystal be become as nematic liquid crystal such that alignment would be a function of surface interaction. Therefore, under appropriate circumstances it is possible that the liquid crystal may be of the smectic liquid crystal type.

Preferably the liquid crystal is birefringent, as was mentioned above. The ordinary index of refraction and the extraordinary index of refraction of birefringent liquid crystal material are different. Therefore, as a result of alignment of the liquid crystal material, one component of plane polarized light, for example, may be retarded relative to the other component; and in this way the state of polarization can be altered. For example, the plane of polarization can be rotated or the light can be changed from right circular polarized to left circular polarized light (or vice versa).

There are a number of electronic components 24 on and/or in the substrate 12, as is seen in FIG. 5, and those components tend to cause the surface 30 of the substrate to be relatively rough or unsmooth having a multitude of peaks 30p and valleys 30v. Surface treatment 32 is provided the surface 30 of the substrate 12. The surface treatment 32 is intended to tend to cause homeotropic alignment of liquid crystal material that is located relatively proximate the surface 30 of the substrate 12.

Various techniques are available for providing the surface treatment 32 to obtain generally homeotropic alignment. For example, the surface 30 may be coated with a Langmuir film using known processing techniques. The Langmuir film is a surfactant, which forms a monomolecular film. Another surface treatment may be provided by applying barium stearate to the surface 30. A further example is to use a steryl silicone material on the surface 30. Still another coating material for the surface 30 is silane. A silane material, for example, provides fatty acid molecules standing on their ends or tails, which tend to cause the nematic liquid crystal structure to align homeotropically. The foregoing are examples of techniques conventionally used to obtain homeotropic alignment of nematic liquid crystal material. Other techniques also may be used to achieve the structure and functions of the invention describe herein.

Absent a specific surface treatment to obtain homeotropic alignment of the liquid crystal material in relative proximity to the surface 30, the liquid crystal structure at the surface 30 would tend to follow the contour of the surface somewhat in parallel thereto. Due to the roughness, unevenness, wariness, etc. of the surface 30, a relatively random orientation of the liquid crystal structure there would tend to occur, which would be undesirable for a liquid crystal cell whose operation in response to the presence or absence of an input, or a variation in the magnitude of the input, should be predictable.

The rubbing surface treatment mentioned above with respect to obtaining homogeneous surface treatment and surface alignment of liquid crystal material may in some instances cause static electrical charge. It may be undesirable to have such a static charge on a semiconductor substrate. If the surface 30 has homeotropic alignment, such rubbing may be avoided.

The liquid crystal material 13a directly in contact with the substrate 11 tends to align and parallel, for example, in a direction from the left hand side of FIG. 5 toward the right hand side of FIG. 5 (or vice versa). Such liquid crystal material usually tends to have a tilt angle relative to the surface 20 of the substrate 11. In many instances such tilt angle is as small as a fraction of a degree up to on the order of 5 degrees and may be even larger. The liquid crystal 13a located further and further away from the surface 20 also tends to have generally homogeneous alignment but may be less and less parallel, i.e., more tilted, relative to the surface 20, as is shown schematically in FIG. 5.

Of the liquid crystal material 13, the liquid crystal material 13b directly engaged with the surface 30 of the substrate 12 tends to have homeotropic alignment. The liquid crystal material has positive dielectric anisotropy. Therefore, the liquid crystal 13 tends to align with respect to or in the direction of an electric field. As is described further below, such homeotropic alignment can be buttressed by application of a relatively low voltage electric field and continues as the field is increased.

The homeotropic alignment surface treatment 32 also may be used in a variable birefringence liquid crystal cell in which the substrate is relatively smooth or flat. An example of such a substrate would be a substrate made of glass material, plastic material, or a solid state material in which the electronic components thereof do not cause a rough, undulating, uneven, etc. surface 30. Although the invention is described having homogeneous alignment at the substrate 11 and homeotropic alignment at the substrate 12, it also is possible that such alignments are the reverse, i.e., homeotropic at substrate 11 and homogeneous at substrate 12. While not a requirement, this reversal would especially be possible if the substrate 12 were planarized to reduce the undulations, peaks, valleys, etc. in the surface 30 or if the substrate 12 were a particularly good specular reflector or had thereon a good quality reflector which reflects a high percentage of incident light.

The substrate 12 preferably is optically reflective. Therefore, light 16 entering the liquid crystal cell 3' from outside 33 the liquid crystal cell through the substrate 11 travels through the liquid crystal material 13, is reflected by the substrate 12, travels back through the liquid crystal material 13, and exits through the substrate 11 to the externally ambient 33.

The reflection characteristic of the substrate 12 may be a natural characteristic of the material of which the substrate 12 is made, including the silicon substrate and/or the electronic components 24 thereof. Alternatively, a separate coating of reflective material generally designated 34 in FIG. 5 on top of the electrode 25 is able to reflect the light 16 may be applied to the substrate 12, for example, above or below the surface treatment 32. Usually the mechanical structure of a liquid crystal cell of a display type device includes in sequential order or a stack a substrate at one side of the liquid crystal cell, a reflector, a surface treatment, and finally the liquid crystal material itself. It is possible that other parts and/or layers may be included in the "stack". Sometimes it may be possible to revise the order so that the reflector is closer to the substrate than the electrode, i.e. , the reflector and the electrode reverse positions in the stack; and this is possible particularly if the electrode is transparent, for example. An exemplary coating material may be a metallized coating of aluminum. The reflective function may be provided by a dielectric stack. The reflector material should be compatible with the semiconductor circuit material and/or the electrode thereof. An advantage of aluminum reflector material and/or some other reflector materials, is that the aluminum blocks transmission of light. Therefore, the reflector can protect the semiconductor material from incident light. Many semiconductor materials are photoconducting, and it is desirable to protect the semiconductor circuit especially while writing the image to the semiconductor material, i.e. providing appropriate signals to the semiconductor parts to apply electric field to the liquid crystal thereby to create an image.

It also is possible that the substrate 12 is not reflective, but rather is optically transmissive. In such case reflection function can be provided optically beyond the substrate 12 (i.e., optically downstream) or the liquid crystal cell 3' could be used in an optical transmission control device, such as a transmissive display or other device. A display using the liquid crystal cell 3' in a light transmissive mode would require liquid crystal material which has twice the birefringence or twice the thickness of the cell to obtain the same amount of optical retardation as is obtained in a reflective mode of operation cell. Twice the birefringence or twice the actual thickness of the liquid crystal cell would double the effective optical thickness of the cell. Furthermore, if desired the liquid crystal cell 3' could be partially transmitting to project an image to the outside world or to superimpose the image created by the liquid crystal cell 3' on another image from the outside world. In such case, some of the light passing into the cell 3' to create an image by the cell could be reflected to the eye of a viewer and some of the light from a device beyond the cell 3' could be transmitted through the cell for viewing by the viewer. Other arrangements which use such a semireflective cell 3' also can be used in accordance with the invention. Even further, if the substrate 12 were transmissive, the reflector 34 or the reflector function could be provided at the substrate 11.

In the liquid crystal cells 3", specular reflection of light is caused at or in the area proximate the substrate 12. Reflection may be a result of a property of the substrate itself; for example, an active matrix substrate with electronic components on it may have a reflection characteristic such that it reflects approximately 80% of the light incident on it. Alternatively or additionally reflection function may be provided by a separate reflective layer 34 applied to the substrate 12. The reflective layer may be, for example, a metallized coating applied to the electrode 25 or electrical layer. The substrate 12 may be prepared by conventional semiconductor processing techniques including masking, etching and material depositing steps. The reflective layer may be put over the electrode 25 while mask material, e.g., the photoresist mask used to fabricate the semiconductor device, still is left in place on the electrode. The mask material then insulates the electrode from the reflector.

The power and control circuit 5 may be a conventional electrical power supply and control of the power or voltage to the liquid crystal cell 3", such as those circuits commonly used in liquid crystal display devices of the variable birefringence type. For example, the circuit 5 may provide a relatively low voltage to achieve one alignment relationship of liquid crystal material 13 and a relatively larger magnitude voltage to obtain a different alignment relationship. The circuit 5 may be used to provide only a single level voltage that is sequenced in a desired way to obtain one alignment characteristic and is sequenced in a different way and/or voltage level to achieve a different alignment characteristic of the liquid crystal 13. The circuit 5 may provide for multiplexer operation of the liquid crystal cell 3", if desired. The circuit 5 may provide a range of output voltages intended to obtain a corresponding range of alignment characteristics of the liquid crystal material 13 in the liquid crystal cell 3" and thereby to obtain a corresponding range of optical phase retardation characteristics.

Figure 6:
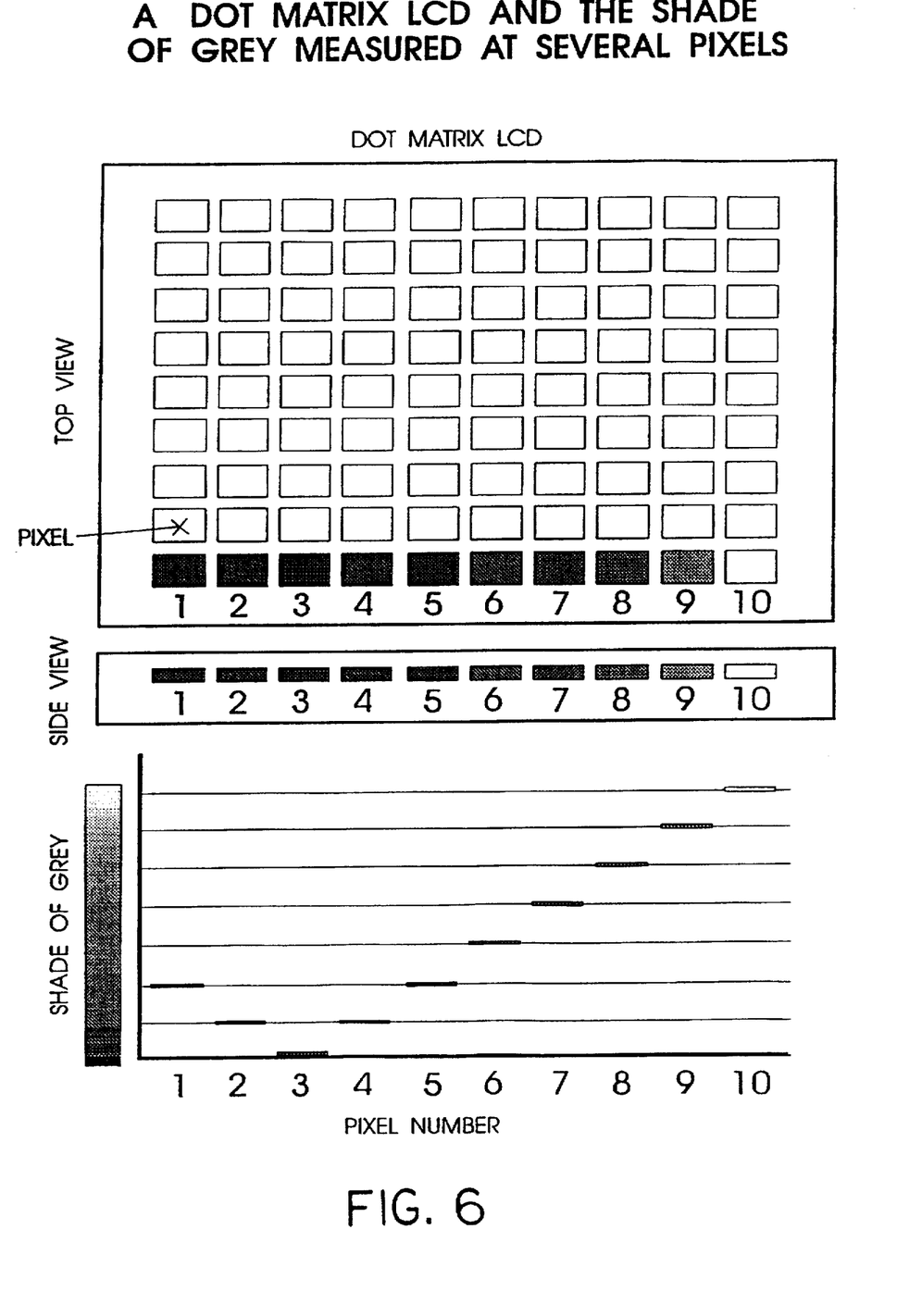
FIGS. 6–11 are schematic graphical illustrations depicting operation of the invention.

Turning to FIGS. 6-11, operation of the apparatus is described. In FIG. 6 a plan view of a dot matrix liquid crystal display is shown. The shade of grey measured at several pixels is indicated. According to the bottom graph in FIG. 6, the actual shade is shown; according to the dot matrix image at the side and top of FIG. 6, the actual shade of the pixel is shown. Thus, at location 1 on the graph at the bottom of FIG. 6, there is a shade 2. At location 2, there is a shade 1. At location 3 there is a shade 0, and so on. In pixel 1 marked in the top of FIG. 6, the pixel is a shade gray of 2; and at the adjacent pixel the pixel is a shade gray of 1, and so on. This is conventional. This would indicate the signals coming in to the computer control 5.

Figure 7:
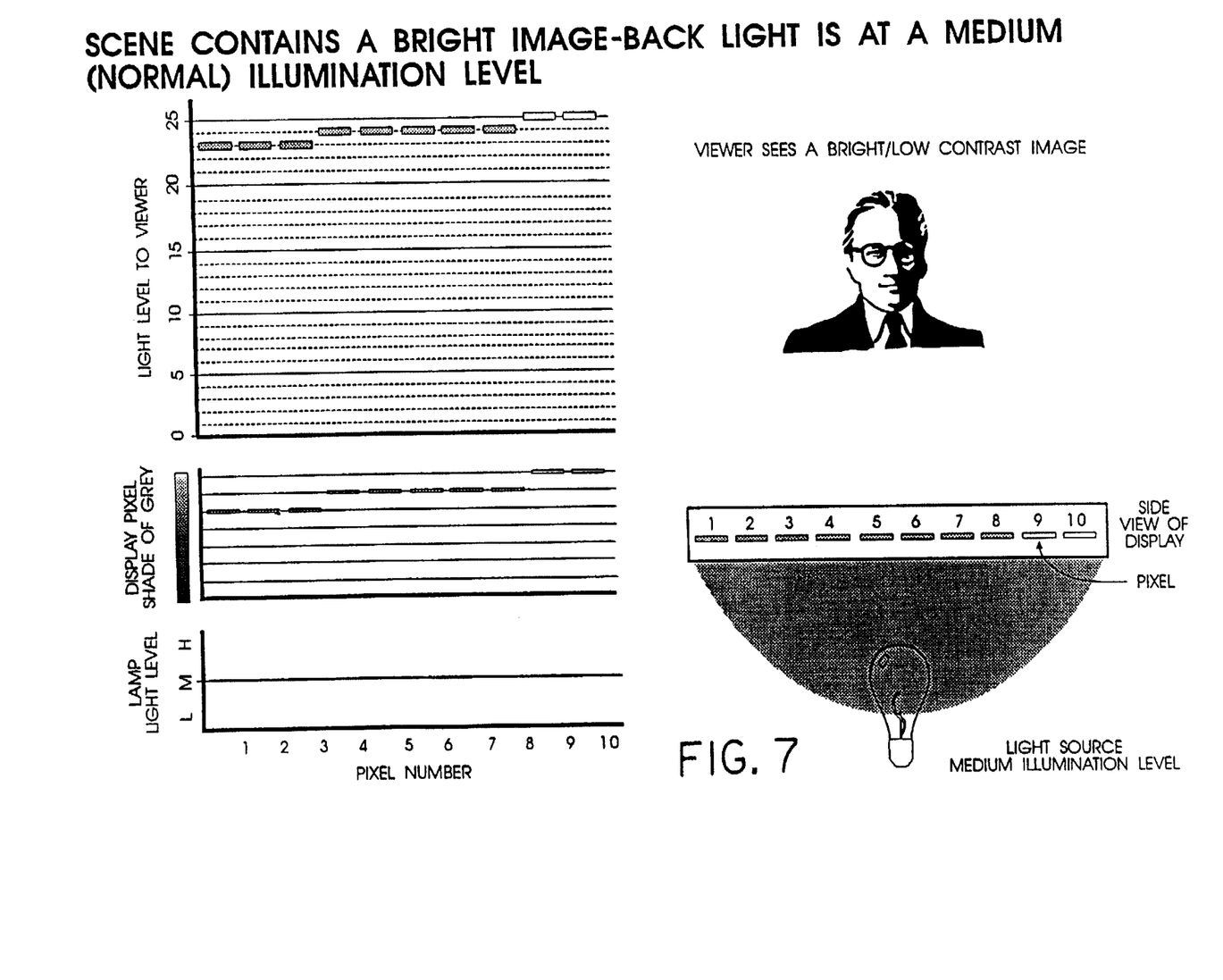

In FIG. 7, an example of a bright image scene produced by back light at a medium (nomad illumination level is illustrated at the top; the shades of gray are shown at the middle left; and the lamp light level is constant at the bottom left. The viewer sees a bright/low contrast image of a person as seen at the top right of the drawing. A side view of the display representing respective pixels and the shade levels thereof is shown at the bottom right of the figure.

Figure 8:
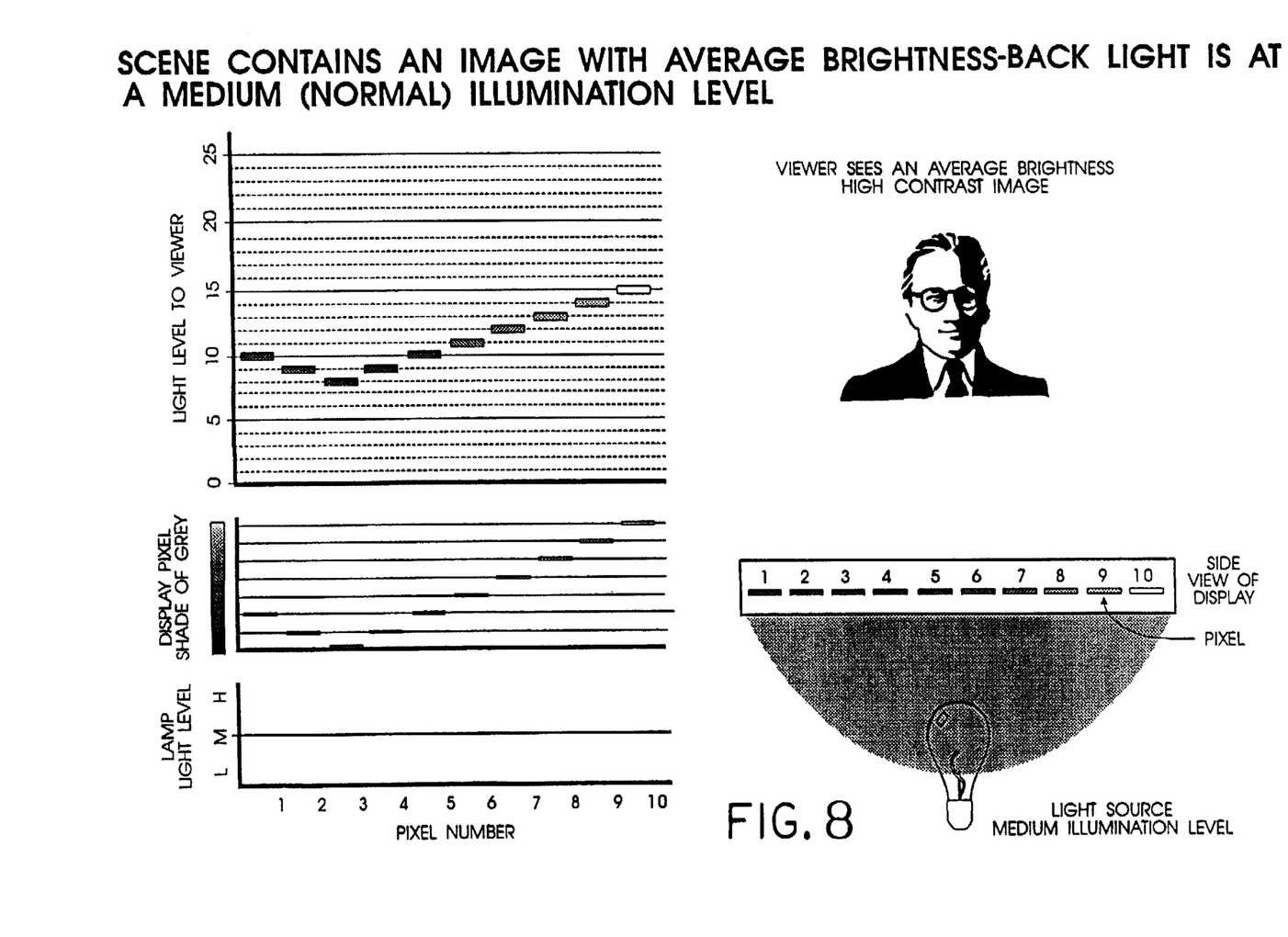

FIG. 8 is similar to FIG. 7 again with average constant lamp light level. The average light level is produced; the average brightness output from the display is to be produced; and the viewer sees an average brightness high contrast image because all conditions are optimized.

Figure 9:
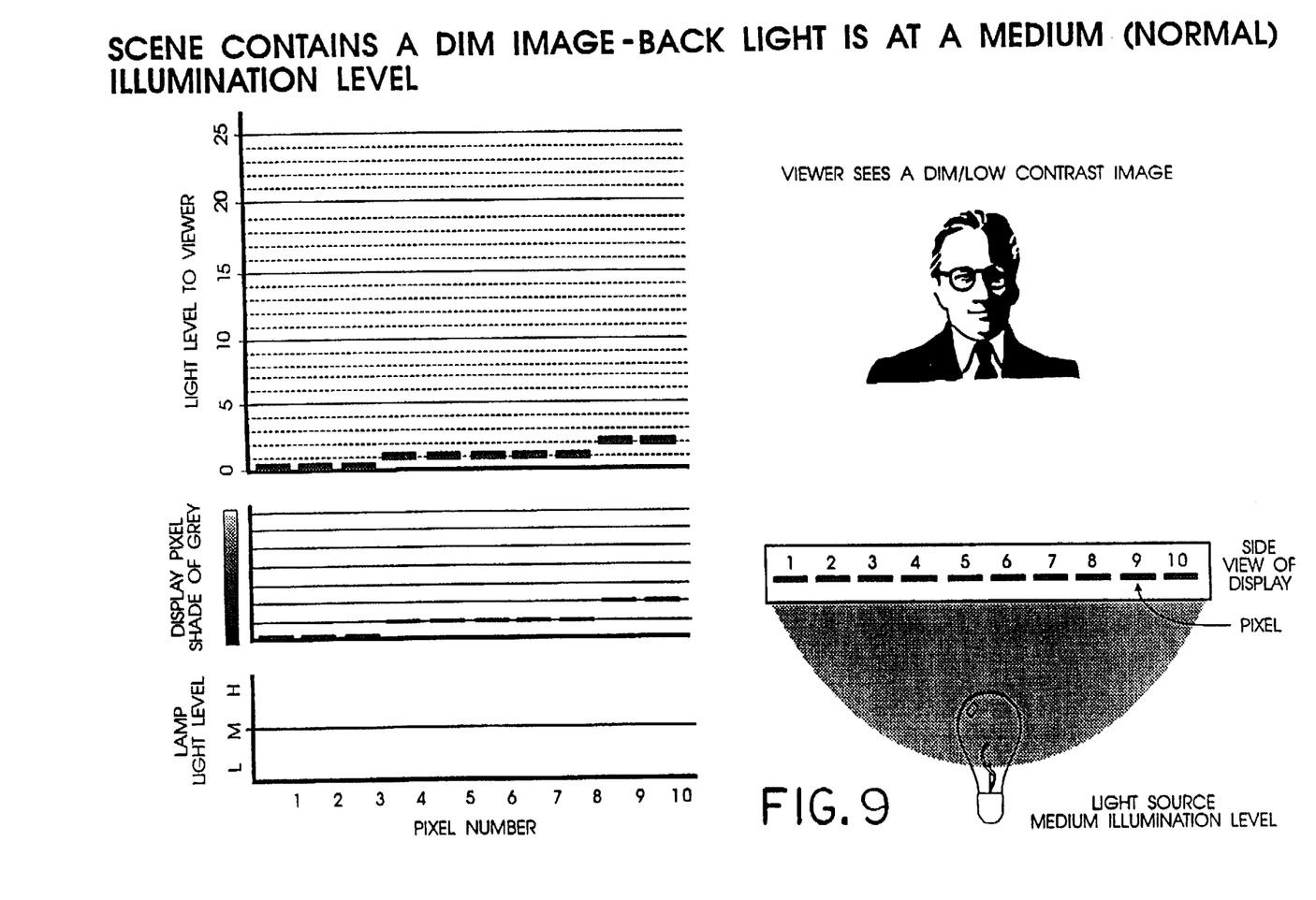

FIG. 9 is similar to FIG. 7 again with average constant lamp light level and a dark transmission provided by the liquid crystal cell; the viewer sees a dim low contrast image.

Figure 10:
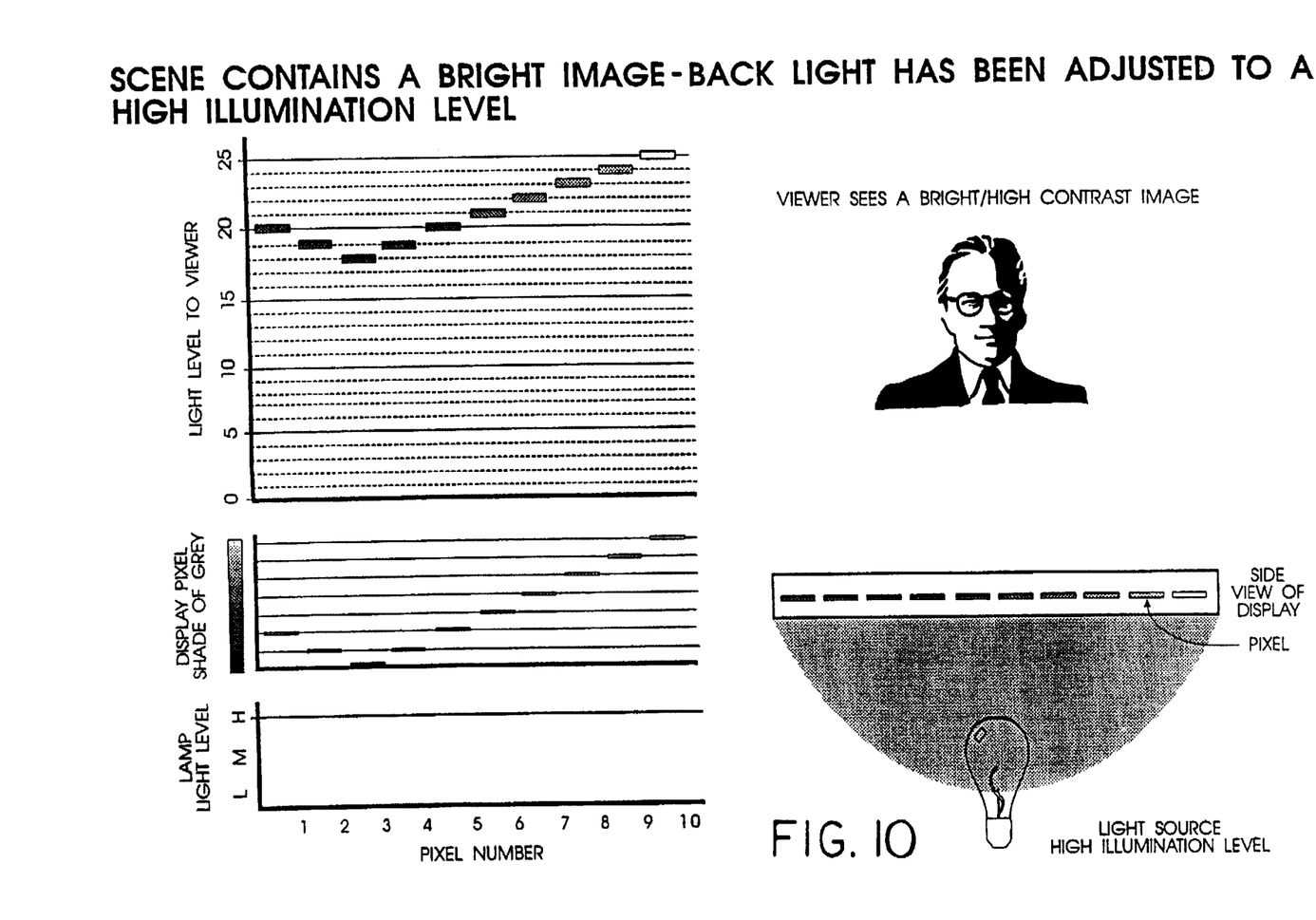
Figure 11:
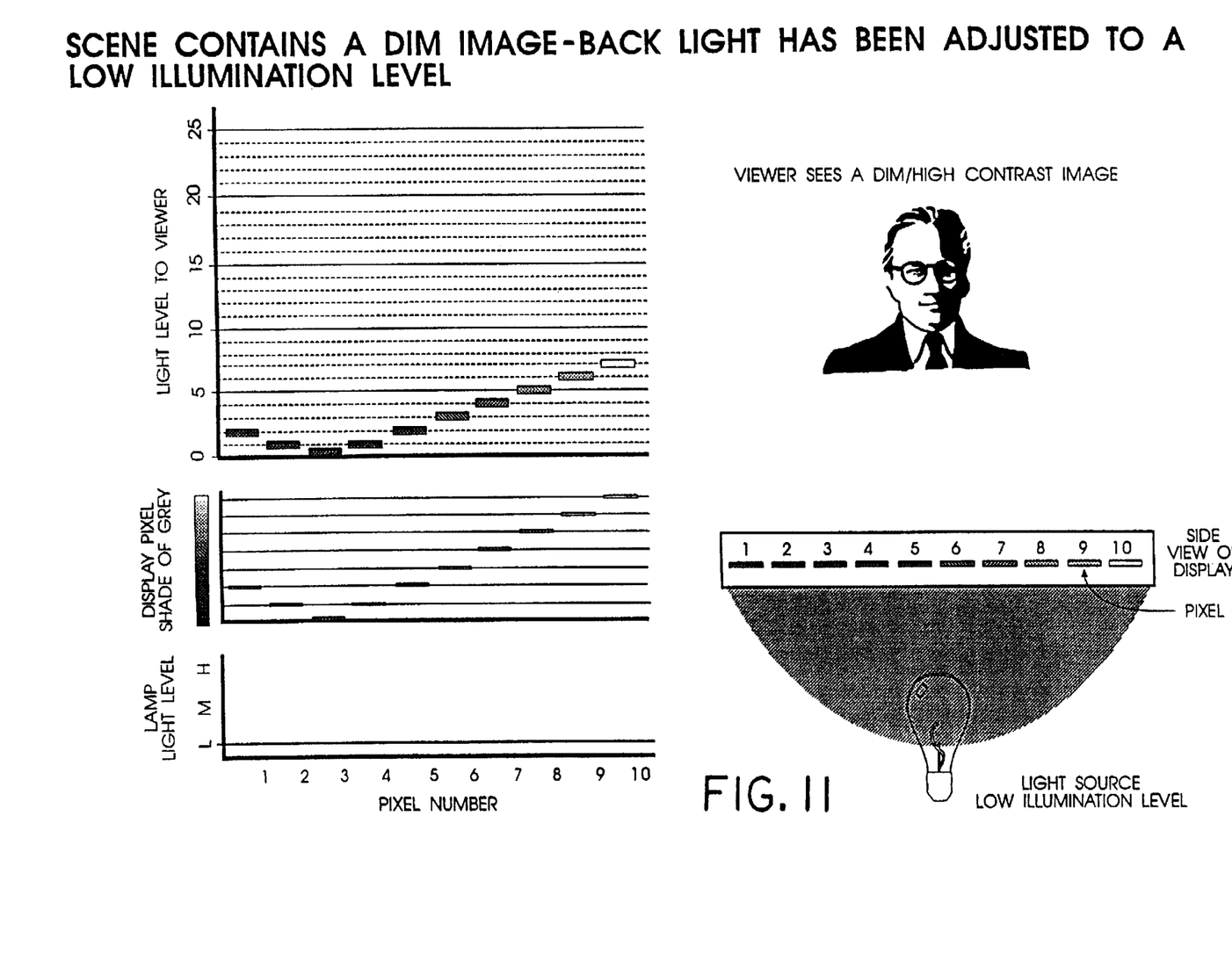

FIGS. 7-9 represent operation of a standard display apparatus. FIGS. 10 and 11 represent applying the principles of the present invention to develop high contrast images. In FIG. 10 it is seen that there is the intent to produce a wide range of gray levels; and this is possible by using a high intensity lamp level; the result is a bright high contrast image. In FIG. 11 it is intended that the viewer see a dim image; the same range of grey shades are provided as is depicted in the middle left graph of the drawing; but the lamp level is low. Therefore, there is a good contrast ratio provide to the viewer; from 0 to about 7 at the brightness level shown in the graph at the upper left of the drawing.

In view of the foregoing, it will be appreciated that the invention enables producing high quality displays.

I claim:

1. Apparatus for displaying an optical image represented by input signals indicating contrast and brightness information of the optical image, comprising a passive light modulating display to modulate light in response to the input signals representing contrast characteristics of the optical image to display the optical image, light supply means for supplying a light input to said display for modulation by said display to produce the optical image output, and control means responsive to the input signals for controlling the intensity of light supplied by said light supply means based on such brightness information, said control means comprising means for controlling, as a function of a desired optical output of the passive light modulating display, the intensity of light provided to the passive light modulating display by the light supply means to alter the brightness of the optical image output substantially without affecting the contrast ratio.

2. The apparatus of claim 1, said control means comprising means for computing the brightness information from the input signals representing at least a portion of an image to be produced by the apparatus and for controlling intensity of light supplied by said light supply means to the passive light modulating display as a function of such computing.

3. The apparatus of claim 2, said means for computing comprising a computer.

4. The apparatus of claim 2, said control means comprising means for computing from the input signals the average brightness of the entire scene containing the optical image for display by the apparatus and for controlling intensity as a function of such average brightness.

5. The apparatus of claim 1 further comprising means for detecting ambient brightness in the local environment where such image output is to be displayed.

6. The apparatus of claim 5, said control means comprising means responsive to said means for detecting for controlling intensity of light supplied to the passive light modulating display also as a function of the ambient brightness.

7. The apparatus of claim 1, the control means comprising means for controlling the passive light modulating display to produce respective images.

8. The apparatus of claim 7, said light supply means comprising a plurality of light sources, and the control means comprising means for controlling the intensity of a plurality of said light sources.

9. The apparatus of claim 8, the control means comprising means for controlling the passive light modulating display to produce frame sequential images and means for controlling respective light sources as a function of which image is produced at a particular time.

10. The apparatus of claim 1, further comprising a plurality of light sources of different respective colors, and said control means comprising means for operating said passive light modulating display in a field sequential mode while controlling the brightness of light emitted from respective light sources, whereby multicolor images are developed.

11. The apparatus of claim 1, said passive light modulating display comprising a liquid crystal display.

12. The apparatus of claim 11, said liquid crystal display comprising a variable birefringence liquid crystal apparatus.

13. The apparatus of claim 11, said liquid crystal display comprising a reflective liquid crystal device.

14. The apparatus of claim 1, said control means comprising means to control intensity while operating the passive light modulating display in a field sequential mode.

15. A method of displaying an image represented by input signals indicating contrast and brightness information of the image, comprising directing light from a light source to a passive light modulating display apparatus, supplying the input signals to the display apparatus representing characteristics of the image to form the image for display, and controlling the intensity of light illuminating the display apparatus from the light source as a function of such brightness information, said controlling comprising controlling, as a function of a desired optical output of the passive light modulating display apparatus, the intensity of light provided to the passive light modulating display apparatus to alter the brightness of the image substantially without affecting the contrast ratio.

16. The method of claim 15; said controlling comprising using a computer to compute the average brightness of the image and controlling intensity of light based on such average brightness.

17. The method of claim 15, comprising producing respective images using the display apparatus in a field sequential mode, and said controlling comprising as each image is produced controlling intensity of the light illuminating the display apparatus.

18. The method of claim 15; comprising producing respective images using the display apparatus in a field sequential mode, and as each image is produced controlling intensity of different respective colors of light from the light source illuminating the display apparatus.

19. The method of claim 15, said directing comprising supplying light from a source to the passive light modulating display apparatus, and further comprising using such display to modulate light to produce an output image, and said controlling comprising controlling intensity of light supplied to the passive light modulating display apparatus as a function of desired brightness of the output image substantially without changing contrast ratio of the output image.

20. The method of claim 15, said directing comprising supplying light from a source to the passive light modulating display apparatus, and further comprising using such passive light modulating display apparatus to modulate such light to produce an output image, and said controlling comprising controlling intensity of light supplied to the passive light modulating display apparatus as a function of desired brightness of the output image.

21. The method of claim 15, said controlling comprising computing from the input signals the brightness information of a particular image or scene and in response to such computation controlling the intensity or brightness of the output light.

22. The method of claim 15, said directing comprising supplying light from a light source to a display, and said controlling of intensity or brightness comprising controlling intensity or brightness of the light source.

23. The method of claim 22, wherein an output image is produced by plural pixels included in the passive light modulating display apparatus, and said controlling comprises modulating light without having to reduce the number of pixels used to transmit light.

24. The method of claim 15, said directing comprising supplying light from a light source to the passive light modulating display apparatus, and wherein an output image is produced by modulating light by plural pixels included in the passive light modulating display apparatus, and said controlling comprises controlling intensity of the light illuminating the passive light modulating display apparatus while a full number or a relatively large number of pixels form an image or scene even if the brightness of the scene is relatively dark.

25. The method of claim 15, said controlling comprising integrating the input signals to determine brightness of light from the light source incident on the passive light modulating display apparatus to form an image output.

* * * * *